(12) United States Patent
Carmean et al.

(10) Patent No.: US 6,370,625 B1
(45) Date of Patent: Apr. 9, 2002

(54) METHOD AND APPARATUS FOR LOCK SYNCHRONIZATION IN A MICROPROCESSOR SYSTEM

(75) Inventors: Douglas M. Carmean, Beaverton; Harish Kumar, Portland; Brent E. Lince, Hillsboro; Michael D. Upton, Portland; Zhongying Zhang, Cornelius, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,698

(22) Filed: Dec. 29, 1999

(51) Int. Cl.$^7$ ................................................ G06F 13/18
(52) U.S. Cl. ........................ 711/152; 711/150; 711/155
(58) Field of Search ................................ 711/200, 130, 711/141, 145, 147, 150, 152, 155, 163

(56) References Cited

U.S. PATENT DOCUMENTS

| | | | | |
|---|---|---|---|---|
| 4,805,106 A | * | 2/1989 | Pfeifer | 710/200 |
| 4,975,870 A | * | 12/1990 | Knicely et al. | 711/152 |
| 5,430,860 A | * | 7/1995 | Capps, Jr. et al. | 711/155 |
| 5,617,556 A | * | 4/1997 | Baumgartner et al. | 711/141 |
| 5,922,057 A | * | 7/1999 | Holt | 710/52 |
| 5,937,199 A | * | 8/1999 | Temple | 711/152 |

* cited by examiner

*Primary Examiner*—B. James Peikari
(74) *Attorney, Agent, or Firm*—Blakely, Sokoloff, Taylor & Zafman LLP

(57) ABSTRACT

A method of controlling operations by one or more processors includes granting ownership of a memory location having data stored therein to a first processor and performing, in an atomic manner by the first processor, a read operation to load the data from the memory location to a register, a modify operation to modify the data in the register, and a write operation to store the data from the register to the memory location. The method also prevents other operations directed towards the data by a second processor while the read, modify, and write operations are performed by the first processor, and vice versa. Ownership of the memory location is released after performing the read, modify, and write operations so as to allow the first or second processors to perform subsequent atomic operations.

27 Claims, 3 Drawing Sheets

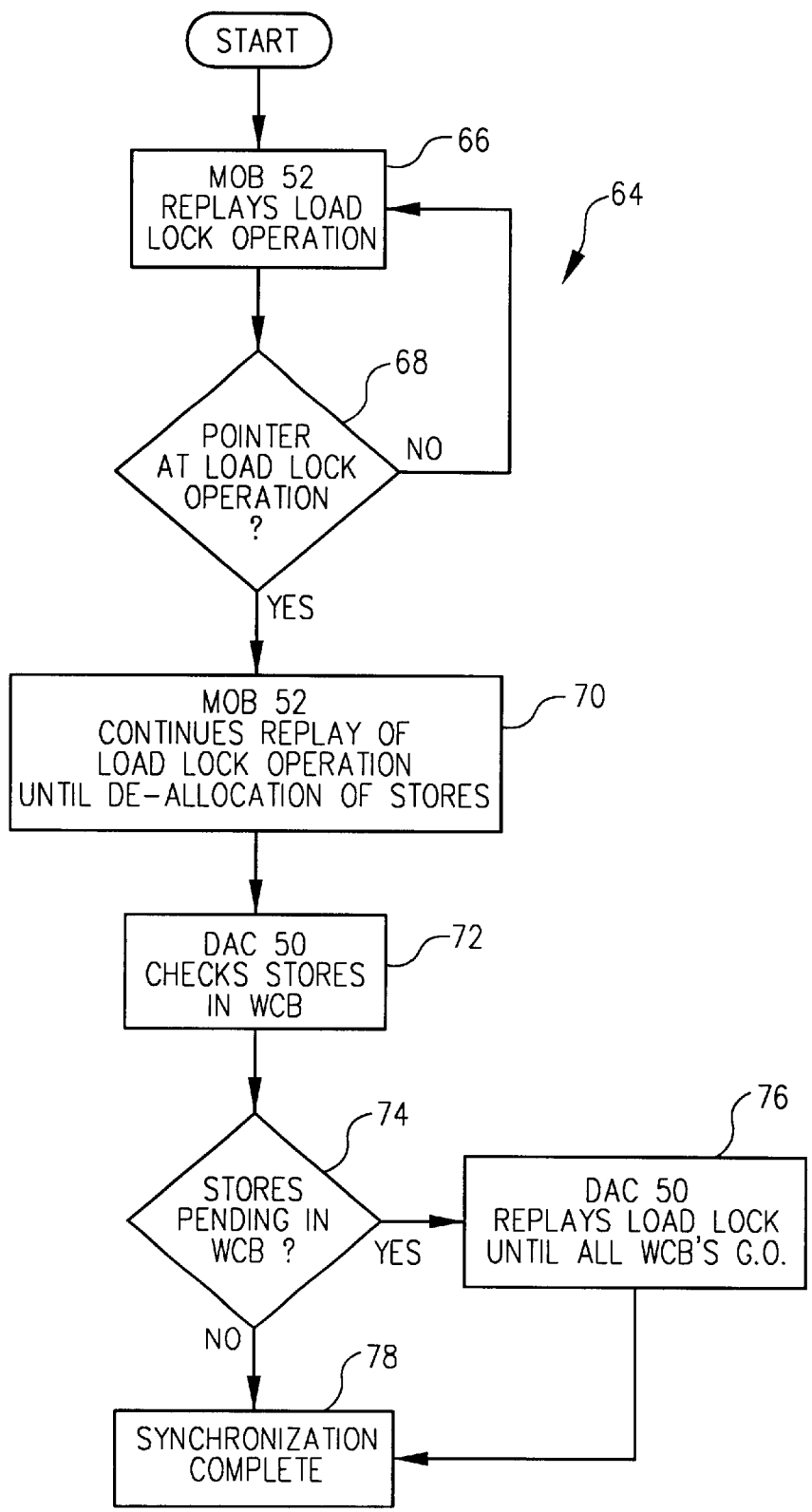

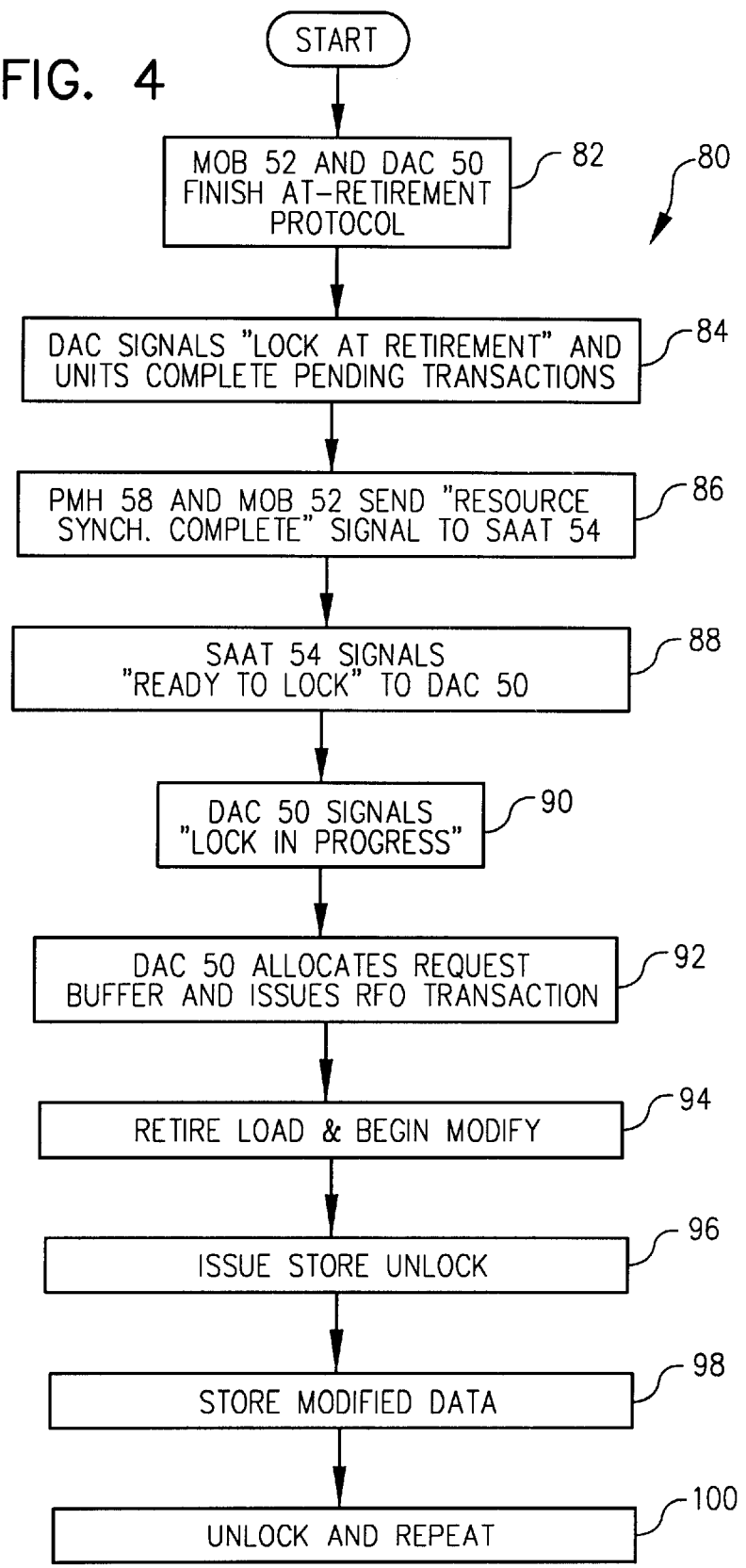

METHOD AND APPARATUS FOR LOCK SYNCHRONIZATION IN A MICROPROCESSOR SYSTEM

BACKGROUND OF THE INVENTION

1. Field of the Invention

The present invention relates generally to computer systems having one or more microprocessors that are capable of speculative or out-of-order processing of instructions, and in particular, relates to the synchronization of the processing of memory instructions by these microprocessors or between their threads.

2. Background Information

Typical computer systems use a single central processing unit (CPU), known as a microprocessor. This microprocessor executes the programs stored in main memory by fetching their instructions, examining them, and then executing them one after another.

In some applications, multiple processors are utilized. A singularly complex task can be broken into sub-tasks. Each subtask is processed individually by a separate processor. For example, in a multiprocessor computer system, word processing can be performed by one processor that handles the background task of printing a document, while a different processor handles the foreground task of interfacing with a user typing on another document. This use of multiple processors allows various tasks or functions, and even multiple applications, to be handled by more than a single CPU, thereby enhancing system efficiency and speed.

Utilizing multiple processors has the added feature that two or more processors may share the same data stored within the system. However, care must be taken to maintain processor ordering. That is, a sequence of "writes" (sometimes referred to as "stores") generated by any processor in the system should be observed in the same order by all other processors. For example, a processor P1 can perform a write operation W1 to a location 1, followed by a write operation W2 to a location 2. The location 2 contains a flag that signals that the data in the location 1 is valid. A processor P2 can continuously perform a "read" (sometimes referred to as a "load") operation R2 on the location 2 until the flag becomes valid. After the flag is observed valid, the processor P2 performs a read operation R1 on the location 1 to read the data. Thereafter, the processor P2 can perform a "modify" operation to change the data. In order for this algorithm to successfully execute in a multiprocessor system, the order in which the read operations R1 and R2 are performed by the processor P2 should be consistent with the order of the write operations W1 and W2 performed by the processor P1.

Further, since the data is being shared between the two processors and for data consistency purposes if both processors P1 and P2 have the capability of performing read, modify, and write operations, the two processors should not be allowed to perform operations on the data simultaneously. That is, while the processor P1 is in a process of reading, modifying, or storing the data, and the processor P2 should not be allowed to concurrently read, modify, or store that data. If the processor P2 is not constrained in this manner, incorrect data or results may be generated.

Further complicating the use of multiprocessors is the fact that processors often contain a small amount of dedicated fast memory, known as a "cache," to increase the speed of operation. As information is called from main memory and used by a processor, the information and its address are stored in a small portion of cache, which is usually static random access memory (SRAM). Because these caches are typically localized to a specific processor, these multiple caches in a multiprocessor computer system can (and usually do) contain multiple copies of a given data item. Any processor or other agent accessing a copy of this data should receive a valid or updated data value, and data being written from the cache back into memory must be the current data. In other words, cache coherency must be maintained by monitoring and synchronizing data written from the cache to memory, or data read from memory and stored in the cache.

Processor ordering and cache coherency based on correct data are important for high-performance processors that utilize out-of-order processing or speculative processing, especially for multiprocessor systems having these types of processors. In out-of-order processing, a software program is not necessarily executed in the same sequence as its source code was written. In speculative processing, branch prediction is performed pending resolution of a branch condition. Once the individual microinstructions have been executed, its results are stored in a temporary state. Finally, macroinstructions are "retired" once all branch conditions are satisfied or once out-of-order results are determined to be correct. The success of these two types of processing methods depends in part on the accuracy, consistency, and synchronization of the data that they read, modify, and write.

Accordingly, given the use of multiple processors, caches, and out-of-order or speculative processing, there is a need to improve ordering of memory instructions and transactions by microprocessors.

SUMMARY OF THE INVENTION

According to one aspect of the invention, a method is provided which includes acquiring ownership of a memory location that stores data, performing an atomic operation directed towards the data, preventing other operations directed towards the data while the atomic operation is performed, and releasing ownership of the memory location after performing the atomic operation.

BRIEF DESCRIPTION OF DRAWINGS

Non-limiting and non-exhaustive embodiments of the present invention will be described in the following figures, wherein like reference numerals refer to like parts throughout the various views unless otherwise specified.

FIG. 3 is a flowchart illustrating a synchronization process according to an embodiment of the invention.

FIG. 4 is a flowchart illustrating a lock operation according to an embodiment of the invention.

DETAILED DESCRIPTION OF THE ILLUSTRATED EMBODIMENTS

Embodiments of a method and apparatus for synchronization of microprocessors through the use of locks are described in detail herein. In the following description, numerous specific details are provided, such as the description of computer system components in FIGS. 1 and 2, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention. Additionally, the terms "lock," "lock sequence," "lock process," or "lock operation" are used interchangeably or in combination throughout this written description, and are more or less intended to mean the same thing, namely, one or more instructions or steps to provide synchronization or coherency between microprocessors or "threads" (described in further detail below) during read, modify, and write operations.

Figure 1:
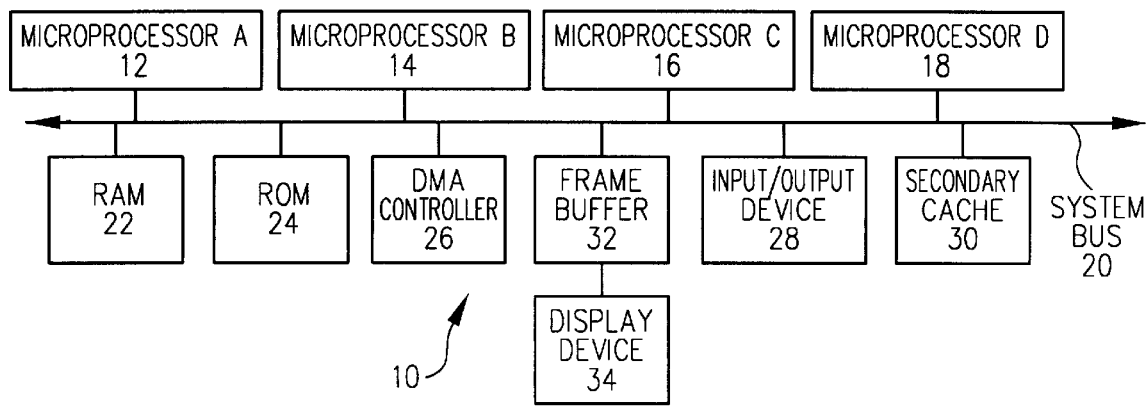
FIG. 1 is a block diagram illustrating a multiprocessor computer system that can utilize an embodiment of the invention.

Referring first to FIG. 1, shown generally at 10 is a block diagram of a computer system that can utilize an embodiment of the present invention. The computer system 10 can be a multiprocessor system having four microprocessors 12–18, for example, interconnected by a system bus 20.

Each microprocessor 12–18 can be associated with one or more threads. While FIG. 1 shows four microprocessors 12–18, the computer system 10 can have any number of microprocessors, including just a single microprocessor. The single microprocessor can in turn be associated with multiple threads in one embodiment. Additionally, the plurality of microprocessors 12–18 can be located on a single die, on multiple dies, or a combination of both in the computer system 10. Consequently, the invention is not limited by a specific number of microprocessors present or by their specific placement on one or more dies.

Each of the microprocessors 12–18 may be capable of speculative and out-of-order execution of instructions, as well as in-order execution. A random access memory (RAM) 22, read only memory (ROM) 24, direct memory access (DMA) controller 26, input/output (I/O) device 28, and secondary cache 30 are connected to the microprocessors 12–18 by the system bus 20. A frame buffer 32 and display device 34, such as a cathode ray tube (CRT), are also connected to the system bus 20. The DMA controller 26 can represent any number of DMA controller devices. Other memory devices (not shown), such as a disk drive, may also be connected to the system bus 20. The I/O device 28 can include a keyboard, modem, mouse, etc.

Although FIG. 1 shows the secondary cache as being separate from the microprocessors 12–18 and connected thereto by the system bus 20, the secondary cache may be present in each microprocessor 12–18. In other implementations, there may be a third cache provided internally in each microprocessor 12–18 or externally thereto via the system bus 20. As such, the invention is not limited by the number of caches or by their specific location in the computer system 10.

Figure 2:
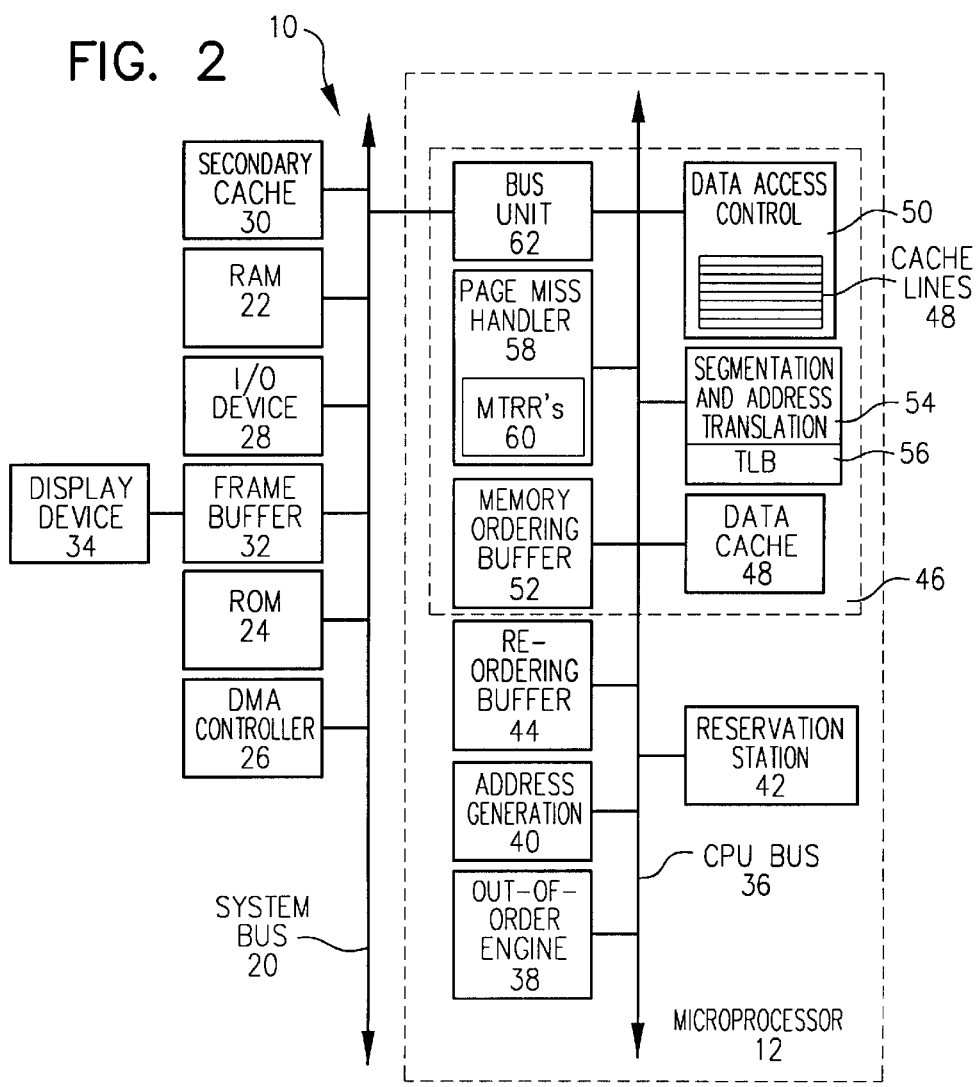
FIG. 2 is a block diagram illustrating components of one of the microprocessors of FIG. 1 according to an embodiment of the invention.

FIG. 2 illustrates some of the components of one of the microprocessors 12–18 of FIG. 1, such as the microprocessor 12, all internally connected by one or more busses illustrated symbolically by a CPU bus 36. In particular, FIG. 2 shows an out-of-order engine 38 that breaks up a program or a complex instruction into microinstructions (referred to herein as microoperations or "uOPs"), such as memory loads and stores. The uOPs are generated by the out-of-order engine 38 in an out-of-order and/or speculative manner so as to exploit any parallelism within the program or to exploit pipelining capabilities of the microprocessor 12. The out-of-order engine 38 can include separate internal components (not shown), such as an instruction fetch/decode unit, microcode unit, and allocater unit.

An address generation unit (AGU) 40 generates a memory address for the uOPs. The uOP containing the address is output from the AGU 40 onto the CPU bus 36, where the uOP is intercepted and stored by a reservation station 42. The reservation station 42 allocates uOPs that have not yet been executed, and then dispatches the uOPs to other functional units according to speculative data dependencies and according to the availability of the other functional units.

A reorder buffer 44 stores speculative results of uOPs dispatched by the reservation station 42 and executed by one of the functional units. That is, the reorder buffer 44 collects results of speculative uOPs, reorders the uOPs, and then retires the uOPs. The reorder buffer 44 does this by reordering the retirement of executed uOPs to yield a sequence of events specified by the program, with an executed uOP being retired once it becomes non-speculative (e.g., once all unresolved conditions or antecedents to the uOP have been resolved).

According to an embodiment of the invention, one or more uOPs associated with a read, modify, and write operation together typically form a single macroinstruction called a "lock." The entire read, modify, and write operation of the lock in an embodiment of the invention is "atomic" (e.g., the operation is indivisible—it needs to be completed or is not completed at all, and so it is done sequentially and in an uninterrupted manner), and as such, the entire lock itself can be viewed as a "single uOP" (e.g., appears like a single operation). Accordingly, as the microprocessors 12–18 perform read, modify, and write memory operations associated with execution of one or more programs or complex instructions, numerous atomic lock operations take place that synchronize the microprocessors or their threads.

This atomic nature of the lock helps to guarantee data consistency between various microprocessor operations. For example, if a load operation is performed by: 1) the microprocessor 12 or one of its threads, 2) another thread of the microprocessor 12, or 3) a microprocessor other than the microprocessor 12, embodiments of the invention provide that the load operation does not read partial results associated with other locks (e.g., associated with a different read, write, modify operation). Also, because the lock is atomic, the lock is guaranteed to make forward progress from start to completion, when the modified data is written back into memory. That is, an embodiment of the invention provides a read, modify, write sequence that is guaranteed to be atomic. This atomicity guarantees that if a microprocessor has been able to successfully read a memory location, then it will be able to modify and write that location without interference from another microprocessor.

Another feature of the locks according to an embodiment of the invention is that ownership of a lock is obtained and honored on a per instruction granularity. That is, when one of the microprocessors 12–18 or their threads is processing a lock (or performing a lock operation), other microprocessors or threads are not allowed to process the lock. A thread on any of the microprocessors 12–18 is thus able to obtain ownership, and once the thread has ownership, the thread is able to complete operations associated with the lock in an uninterrupted manner.

In more specific terms, a memory address ADDR A of a lock can be the item that the microprocessors 12–18 use to identify the lock. A read, modify, write lock sequence can be observed or defined as follows:

1. LoadLock EAX<- ADDR A
2. EAX<- EAX+New Value
3. Store Unlock ADDR A<- EAX

Operation 1 performs the read operation by loading a microprocessor register EAX with a value specified by the lock address ADDR A. Operate 2 performs the modify operation on the contents of the EAX register, and Operation 3 performs the write operation by updating the ADDR A address specified by the lock with the new information.

It is noted that in an embodiment of the invention, the address ADDR A is protected during this lock sequence. This means that other load operations are not allowed to read contents of that particular memory location ADDR A while the lock sequence is in progress. In addition, it is further noted that other store (e.g., write) operations are not allowed to change the contents of ADDR A while the lock is in progress.

In general, the lock may sequence through the following steps or elements in order to provide the properties that have been previously described above:

A. Perform machine synchronization to ensure that there are no operations older than the lock that are pending to the lock address.

B. Reserve required resources to ensure that the lock has all necessary resources to complete the lock operation.

C. Obtain ownership of the lock address prior to starting the lock by performing a read for ownership (RFO) operation on the specific line in the memory and storing the contents of the line in a cache.

D. Start the lock operation and block all other transactions to the lock address.

E. Complete the lock operation and ensure that the lock address has been properly updated before releasing the lock.

These elements A–E are described in detail by referring first to a memory system or memory cluster 46 of the microprocessor 12 shown in FIG. 2. According to an embodiment of the invention, each of the microprocessors 12–18 can have the memory cluster 46. In other embodiments, the microprocessors 12–18 can share one or more components of a single memory cluster 46.

The memory cluster 46 can have multiple levels of on-board caches. For instance, the memory cluster 46 can include in a data-only cache 48, which can be an eight kilobyte, "write-through" cache. With "write-through" protocol, data modified in the data cache 48 is immediately transmitted to external memory (e.g., to the RAM 22 or to the secondary cache 30). The memory cluster 46 can include another cache (not shown) which contains both instructions and data. This cache can be a 256 kilobyte, "write-back" cache. With "write-back" protocol, data modified in the cache(s) is not immediately transmitted to external memory, but rather, is held in abeyance and then transmitted to external memory in a burst mode. The memory cluster 46 can further include yet another cache (not shown) that is one megabyte in size, for example. One or more of these caches can be distinct components in the memory cluster 46, or they can be cache lines 48 forming part of a data access control (DAC) unit 50.

The DAC unit 50 controls all transactions that "miss" the data cache 48 or other caches, and any particular transaction that requires special handling. As will be described in further detail below, locks fall into the class of transactions that require special handling by the DAC unit 50 and other units in the memory cluster 46. Included among these transactions are transactions where the DAC unit 50 stores data or instructions and corresponding memory addresses of recently accessed portions of the external memory.

The memory cluster 46 also includes a memory ordering buffer (MOB) 52. Among other functions, the MOB 52 ensures that load operations are ordered with respect to older store operations, and that load operations are ordered with respect to external snoop operations. The MOB 52 is further responsible for sequencing store operations through the memory hierarchy.

A segmentation and address translation (SAAT) unit 54 contains translation look-a-side buffers (TLBs) 56 that translate linear addresses of the caches, such as those of the data cache 48, into corresponding physical addresses in the external memory. A page miss handler (PMH) 58 performs a "page table walk" to determine a physical address corresponding to a linear address of a memory instruction if there is a "miss." That is, as each new read or write command is issued, the memory cluster 46 looks to the data cache 48, for example, to see if the information exists there. A comparison of the desired address and the addresses in the data cache 48 is made. If an address in the data cache 48 matches the address sought, then there is a "hit" (e.g., the information is available in the data cache 48). The information is then accessed in the data cache 48 so that access to external memory is not required, thereby rapidly processing the command. If the information is not available in the data cache 48, then there is a "miss," and the new data can be copied from external memory and stored in the data cache 48 for future use.

The PMH 54 walks the page tables on any TLB misses (e.g., where the TLB 56 is unable to match a linear address with a physical address), and sequences split operations. For example, the PMH 54 can walk the page tables and assign linear addresses to physical addresses by looking at data contained in memory type range registers (MTRRs) 60.

The data cache 48, DAC unit 50, MOB 52, SAAT 54, PMH 58 are connected together and are interconnected to other components of the microprocessor 12 by the CPU bus 36. A bus unit 62 allows data and instructions to be transmitted between the internal components of the microprocessor 12 and the external components, such as the secondary cache 30, RAM 22, and ROM 24 external memories.

The features of locks and lock operations will now be described with reference to FIGS. 2–4 read in conjunction with each other. First, before one or more specific lock operations are performed, machine synchronization of the memory cluster 46 should be established (identified as element A previously listed above) to ensure that there are no operations older than the lock that are pending to the lock address. This synchronization helps to guarantee that the lock operation is utilizing current data and/or being executed at the appropriate time. In order to synchronize the lock operation against all older transactions, the DAC 50 and the MOB 52 can invoke a protocol called "at-retirement."

An embodiment of an at-retirement protocol 64 is illustrated by a flowchart shown in FIG. 3. This at-retirement protocol 64 helps to ensure that the lock operation will replay until it becomes the at-retirement uOP, and that all older memory operations have been properly observed in the memory hierarchy. In an embodiment of the invention, the MOB 52 has a copy of a retirement pointer (not shown) and maintains all store operations, and thus the MOB 52 can perform the bulk of the functions associated with the at-retirement protocol 64.

The first part of the MOB's 52 action in the at-retirement protocol 64 is to replay a "load lock operation" at step 66 until the retirement pointer is actually pointing at the load lock operation. The "load lock operation" is associated with the actual loading of the lock from a memory address, such as the address ADDR A, to a register, such as the register EAX, for example. If at step 68 the retirement pointer is pointing at the load lock operation, the load lock operation is known to be the oldest active uOP in the machine (e.g., the memory cluster 46) at this point. If the retirement pointer is not pointing at the "load" lock operation at step 68 (e.g., the load lock operation is not the oldest active uOP), then step 66 is repeated.

Next at step 70, after the the load lock operation is determined to be the oldest active uOP in step 68, the MOB 52 continues to replay the load lock until any pending store operations or associated data have been deallocated from corresponding store buffer(s) (not shown).

After the MOB 52 has completed its part of the at-retirement protocol 64 step 70, the DAC 50 assumes responsibility at step 72 by checking the state of any store operation or associated data that may be pending in its write combining buffer (WCB) (not shown). If at step 74 it is determined that there are pending, uncommitted stores in the WCB, the DAC 50 replays the load lock operation at step 76 until all WCBs have been globally observed. Subsequently, the machine (e.g., the memory cluster 46) is fully synchronized at step 78.

Next, prior to beginning the lock process itself, the memory cluster 46 may need to make sure that it has all resources available to complete the lock operation (e.g., perform resource synchronization), and if it does, then the lock operation is subsequently performed (all previously identified as elements B–E above). The resource synchronization process and subsequent lock process is represented generally at 80 by the flowchart shown in FIG. 4.

As initial considerations, the lock operation uses the MOB 52 to process the "write" (e.g., store) portion of the lock sequence. Thus, in one embodiment of the invention, all of the store resources in the MOB 52 are available to complete this write operation. The SAAT 54 is used for both address translation and potential split register allocation. The PMH 58 is used to sequence any splits that may exist in the lock sequence.

The resource synchronization and lock process 80 begins when the MOB 52 and DAC 50 have finished the at-retirement protocol 64 (see, e.g., FIG. 4) at step 82. At this point, the DAC 50 signals "Lock At Retirement" to all of the units in the memory cluster 46 at step 84. In response, all of the units complete any pending transactions (which can only be younger uOPs at this point). When all of these units and/or their resources are free, each unit signals that to its respective partner that it is ready. In the cases of the PMH 58 and the MOB 52, they both send a Resource Synchronization Complete signal to the SAAT 54 at step 86. Once the SAAT 54 has seen these synchronization signals from both the PMH 58 and the MOB 52, and has all of its resources free, it signals "Ready To Lock" to the DAC 50 at step 88.

The lock sequence subsequently begins. The DAC 50 now signals "Lock In Progress" at step 90 to all of the units in the memory cluster 46. All of the units interpret this signal as an indication that their resources are effectively blocked, and are only to be used by the current lock operation that is at-retirement. It is noted there could be younger lock operations being replayed during this time, but these are not yet at at-retirement and so are not processed.

The DAC 50 assumes responsibility for the lock sequencing after signaling "Lock In Progress" at step 90. At step 92, the DAC 50 obtains ownership for the lock by first allocating a request buffer (not shown) for the lock, and then issuing a RFO transaction to read the lock from a memory address. The load lock operation is replayed the entire time that the DAC 50 is waiting for the RFO to complete. After the RFO completes, the lock is considered "owned" and ready to be modified by the modify operation. The DAC 50 now lets the load lock operation retire at step 94, thereby enabling the modify operation of the lock sequence to take place.

It is noted that at step 92 where the DAC 50 accepted the load lock operation by allocating a request buffer, the DAC 50 starts blocking other transactions that could be attempting to access the lock's address. The DAC 50 does this by setting a dedicated bit in the request buffer that indicates that the particular buffer is locked. As such, the DAC 50 unconditionally replays any load operations that hit the locked request buffer, until the request buffer is unlocked. This effectively guarantees that no other load transactions can load (e.g., "read") the contents of the lock until the lock sequence has been completed.

In an embodiment of the invention, the DAC 50 only guards against load and external snoop operations. Store operations from this microprocessor 12 are being blocked by the MOB 52 in such an embodiment. No other store operations on this thread can be dispatched by the MOB 52, as they are not eligible for retirement. In one embodiment of the invention, the MOB 52 actively blocks the dispatch of store operations on the other thread while the DAC 50 is holding the Lock In Progress signal active.

The DAC 50 continues to hold the Lock In Progress signal active until it sees the Store Unlock uOP at step 96. As described above, the retirement of the load lock operation allowed the memory cluster 46 to proceed with the modify portion of the lock sequence at step 94, with the Lock In Progress signal being active during the modify operation. In one embodiment, the modify operation is done speculatively, based on the speculation that the load operation hit the data cache 48 (e.g., found the need data in the data cache 48 or in other caches). Once the modify operation has been completed and retired, the Store Unlock uOP is eligible for retirement. When the Store Unlock uOP retires, the MOB 52 dispatches it to the DAC 50. Upon seeing the Store Unlock uOP, the DAC 50 processes it as if it where a normal store operation and stores the modified data in the appropriate cache line and/or memory address at step 98. In one embodiment, the store operation may be speculative in that it is based on the assumption that the modify operation has occurred. Once the store operation has been fully processed, the DAC 50 unlocks the buffer at step 100 so that the next at-retirement lock operation can be performed. The unlocking process also allows other accesses to the previously locked memory location to proceed.

In summary, therefore, embodiments of the invention provide an atomic lock process having read, modify, and write operations. A microprocessor or thread has ownership of the lock while it is being processed, thereby precluding other microprocessors or threads from accessing the lock (or its corresponding data) while the lock is processed. The described lock synchronization method according to embodiments of the invention can be embodied in hardware, software or other instructions stored in a computer-readable or machine-readable medium, or other similar components, as those skilled in the art will recognize based on the description of the embodiments provided herein.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   acquiring ownership of a memory location address having data stored therein;
   performing an atomic operation directed towards the data based on data speculation wherein data speculation comprises speculating that correct data is present in the memory location address;
   preventing other operations directed towards the data while the atomic operation is performed;
   releasing ownership of the memory location address after performing the atomic operation; and
   allowing another operation, during the atomic operation, on data stored at a different memory location address in the same memory location.

2. The method of claim 1 wherein the atomic operation comprises a read operation, modify operation, and write operation.

3. The method of claim 1 wherein performing the atomic operation directed towards the data corresponds to a performance associated with a first thread of a microprocessor and wherein preventing other operations on the data while the atomic operation is performed corresponds to a prevention of a performance associated with a second thread of the microprocessor.

4. The method of claim 1 wherein performing the atomic operation directed towards the data corresponds to a performance associated with a first microprocessor and wherein preventing other operations on the data while the atomic operation is performed corresponds to a prevention of a performance associated with a second microprocessor.

5. The method of claim 1, further comprising acquiring subsequent ownership of the memory location address and performing another atomic operation on the data.

6. The method of claim 1 wherein performing the atomic operation towards the data comprises:
   loading a register with the data and its corresponding memory location address;
   performing a modification of the data in the register based on data speculation; and
   writing the modified data from the register to the memory location address.

7. The method of claim 1 wherein preventing other operations on the data while the atomic operation is performed comprises preventing read, modify, or write operations on the data by a thread unrelated to another thread associated with the atomic operation.

8. The method of claim 1 wherein acquiring ownership of the memory location address having data stored therein and performing the atomic operation directed towards the data comprises:
   acquiring ownership of a register location;
   loading the data into the register location from the memory location address;
   performing at least a part of the atomic operation on the data loaded into the register location based on data speculation; and
   returning the data from the register location to the memory location address.

9. The method of claim 1, further comprising using an out-of-order microprocessor to perform the atomic operation.

10. The method of claim 1, further comprising synchronizing the performing of the atomic operation by first globally observing prior operations.

11. The method of claim 1 wherein releasing ownership of the memory location address after performing the atomic operation comprises unlocking a buffer associated with the atomic operation.

12. The method of claim 1 wherein acquiring ownership of the memory location address comprises allocating a request buffer for the atomic operation and issuing a read for ownership transaction to the memory location address.

13. The method of claim 1 wherein preventing other operations on the data while the atomic operation is performed comprises blocking transactions to access an address associated with the atomic operation.

14. A method, comprising:
   granting ownership of a memory location address having data stored therein to a first processor;
   performing, in an atomic manner by the first processor, a read operation to load the data from the memory location address to a register, a modify operation to modify the data in the register based on data speculation wherein data speculation includes a speculation that correct data is present in the register, and a write operation to store the data from the register to the memory location address;
   preventing other operations directed towards the data by a second processor while the read, modify, and write operations are performed by the first processor; and
   releasing ownership of the memory location address after performing the read, modify, and write operations to allow the first or second processors to perform subsequent atomic operations on data in the same memory location address; and
   allowing an operation, during the atomic operation by the first processor, by the second processor on data stored at a different memory location address in the same memory location.

15. The method of claim 14, further comprising retiring previous atomic operations prior to granting ownership of the memory location address to the first processor.

16. The method of claim 14 wherein granting ownership of the memory location address to the first processor comprises granting ownership of an address associated with the read, modify, and write operations to the first processor.

17. The method of claim 14, further comprising:
   synchronizing the read, modify, and write operations against prior operations; and
   reserving resources of units associated with performing the read, modify, and write operations by having the units complete pending operations.

18. A microprocessor, comprising:
   a data access control (DAC) unit to control access to memory;
   a memory ordering buffer (MOB) coupled to the DAC unit to order load operations with respect to store operations; and
   a segmentation and address translation (SAAT) unit coupled to the DAC unit and to the MOB to translate between cache addresses and memory addresses, wherein if the SAAT unit sends a ready signal to the DAC, the DAC controls performance of a load operation to load data from a memory address to a cache address by blocking other load operations to the memory address and the MOB blocks store operations to the memory address, the DAC performing the load operation and a resulting store operation from the cache address to the memory address in an atomic manner based on data speculation, the DAC capable to allow another atomic operation, during the atomic load and store operations, on data stored at a different memory address in the memory.

19. The microprocessor of claim 18, further comprising a page miss handler (PMH) coupled to the DAC unit, the MOB, and the SAAT unit, wherein the PMH sequences splits in the load or resulting store operations, the PMH unit sending a resource synchronization signal to the SAAT unit if pending transactions of the PMH unit are completed, the SAAT unit sending the ready signal if it receives the resource synchronization signal.

20. The microprocessor of claim 18 wherein a modify operation is performed on the data in the cache address and wherein the load, modify, and resulting store operations are performed in an atomic manner.

21. The microprocessor of claim 18 wherein the load operation and the blocked other load operations are associated with different threads of the microprocessor.

22. A computer system, comprising:
a first microprocessor coupled to a memory;
a second microprocessor coupled to the first microprocessor, the second microprocessor including:
a data access control (DAC) unit to control access to the memory by the first or second microprocessors;
a memory ordering buffer (MOB) coupled to the DAC unit to order load operations with respect to store operations; and
a segmentation and address translation (SAAT) unit coupled to the DAC unit and to the MOB to translate between cache addresses and memory addresses, wherein if the SAAT unit sends a ready signal to the DAC unit, the DAC unit controls performance of a load operation by the second microprocessor to load data from a memory address to a cache address by blocking other load operations to the memory address by the first microprocessor and the MOB blocks store operations to the memory address by the first microprocessor, the DAC unit performing the load operation and a resulting store operation from the cache address to the memory address in an atomic manner based on data speculation.

23. The computer system of claim 22 wherein the first and second microprocessors are located on a same die.

24. The computer system of claim 22 wherein the load operation of the second microprocessor is associated with a first thread of the second microprocessor, the DAC unit further preventing performance of a load operation of the same memory address associated with a second thread of the second microprocessor if the load operation associated with the first thread is being performed.

25. A machine-readable medium having stored thereon instructions, which when executed by a set of microprocessors, cause the set of microprocessors to perform the following:
acquire ownership of a memory location address having data stored therein;
perform an atomic operation directed towards the data using data speculation wherein data speculation comprises speculating that correct data is present in the memory location address;
prevent other operations on the data while the atomic operation is performed; and
release ownership of the memory location address after performing the atomic operation; and
allow another operation, during the atomic operation, on data stored at a different memory location address in the same memory location.

26. The machine-readable medium of claim 25 wherein the atomic operation comprises a read operation, modify operation, and write operation.

27. The machine-readable medium of claim 25 wherein performance of the atomic operation directed towards the data corresponds to a performance associated with a first thread of one of the microprocessors and wherein prevention of other operations on the data while the atomic operation is performed corresponds to a prevention of a performance associated with a second thread of the one microprocessor.

* * * * *